United States Patent
Freeman et al.

(10) Patent No.: US 11,092,027 B2
(45) Date of Patent: Aug. 17, 2021

(54) TURBINE SHROUD ASSEMBLY WITH SHEET-METAL SEALING FEATURES

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); David J. Thomas, Brownsburg, IN (US); Jeffrey A. Walston, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/688,562

(22) Filed: Nov. 19, 2019

(65) Prior Publication Data

US 2021/0148244 A1    May 20, 2021

(51) Int. Cl.
  *F01D 11/08*    (2006.01)
  *F01D 25/24*    (2006.01)

(52) U.S. Cl.
  CPC ........... *F01D 11/08* (2013.01); *F01D 25/246* (2013.01); *F05D 2220/323* (2013.01); *F05D 2230/60* (2013.01); *F05D 2240/11* (2013.01); *F05D 2240/55* (2013.01); *F05D 2250/75* (2013.01); *F05D 2300/6033* (2013.01)

(58) Field of Classification Search
  CPC ...... F01D 11/003; F01D 11/005; F01D 11/08; F01D 11/12; F01D 11/18; F01D 25/248; F01D 9/04; F05D 2240/11; F05D 2260/31; F05D 2260/38; F05D 2300/6308; F05D 2300/60331; F16J 15/0887
  See application file for complete search history.

(56) References Cited

U.S. PATENT DOCUMENTS

| | | | |
|---|---|---|---|
| 5,738,490 A * | 4/1998 | Pizzi | F01D 11/08 415/139 |
| 8,944,756 B2 | 2/2015 | Lagueux | |
| 9,850,775 B2 | 12/2017 | Pietrobon et al. | |
| 10,001,022 B2 | 6/2018 | Strock et al. | |
| 10,087,771 B2 | 10/2018 | McGarrah | |
| 10,132,184 B2 | 11/2018 | McCaffrey et al. | |
| 10,138,750 B2 | 11/2018 | McCaffrey et al. | |
| 10,161,258 B2 | 12/2018 | McCaffrey et al. | |
| 10,221,715 B2 | 3/2019 | Varney et al. | |
| 10,233,844 B2 | 3/2019 | Bogard et al. | |
| 2014/0366556 A1 * | 12/2014 | Banks | F01D 25/246 60/806 |

(Continued)

*Primary Examiner* — Woody A Lee, Jr.
*Assistant Examiner* — Maxime M Adjagbe
(74) *Attorney, Agent, or Firm* — Barnes & Thornburg LLP (57) ABSTRACT

A turbine shroud assembly for use with a gas turbine engine includes a carrier assembly coupled to a blade track segment, and a sheet-metal seal that seals on axial and radial facing surfaces therebetween. The blade track segment includes a shroud wall that extends circumferentially partway around an axis and an attachment feature that extends radially outward from the shroud wall. The carrier is coupled with the attachment feature to support the blade track segment.

20 Claims, 3 Drawing Sheets

(56) References Cited

U.S. PATENT DOCUMENTS

| | | | |
|---|---|---|---|
| 2016/0177786 A1* | 6/2016 | Sippel | F01D 11/08 |
| | | | 416/189 |
| 2016/0348523 A1* | 12/2016 | Thomas | F01D 11/005 |
| 2017/0009594 A1* | 1/2017 | Snyder | F01D 11/005 |
| 2017/0089211 A1 | 3/2017 | Broomer et al. | |
| 2018/0051629 A1* | 2/2018 | Teixeira | F01D 11/005 |
| 2018/0340440 A1* | 11/2018 | Freeman | F01D 9/042 |

* cited by examiner

FIG. 6

TURBINE SHROUD ASSEMBLY WITH SHEET-METAL SEALING FEATURES

FIELD OF THE DISCLOSURE

The present disclosure relates generally to gas turbine engines, and more specifically to sealing features for turbine shrouds adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

According to an aspect of the present disclosure, a turbine shroud assembly for use with a gas turbine engine may include a carrier, a blade track segment, and a first seal. The carrier may be made of metallic materials and arranged circumferentially around an axis. The carrier may have a support body and a mount flange that extends radially away from the support body. The blade track segment can be made of ceramic matrix composite materials. The blade track segment may be supported by the carrier to locate the blade track segment radially outward of the axis. The blade track segment may include a shroud wall that extends circumferentially partway around the axis and an attachment feature that extends radially outward from the shroud wall. The shroud wall may define a portion of a gas path of the turbine shroud assembly. The attachment feature may couple with the support body of the carrier.

The first seal may be made of sheet metal materials and arranged circumferentially at least partway around the axis. The first seal may couple with an axially facing surface of the support body of the carrier. The first seal may be biased into engagement with a radially outwardly facing surface of the blade track segment to block gases from flowing between the carrier and the blade track segment. In some embodiments, the first seal is brazed with the carrier to fix the first seal to the carrier.

In some embodiments, the turbine shroud assembly may also include a plurality of fasteners that extend through the carrier and the first seal. The fasteners may couple the first seal with the carrier.

In some embodiments, the carrier may include a first segment and a second segment that meet along an axial interface. The first segment and the second segment may cooperate to define the support body. The mount flange and the support body may be formed to define hanger arms that support the attachment feature of the blade track segment.

In some embodiments, the turbine shroud assembly may also include a second seal located axially between the attachment feature and the first seal. In some embodiments, the first seal may be formed to define a groove that receives a portion of the second seal.

In some embodiments, the first seal may extend radially inward along the axially facing surface of the support body. The first seal may also turn axially to extend along a portion of the radially outwardly facing surface of the shroud wall. The first seal may also turn radially outwardly to extend along a portion of the attachment feature.

In some embodiments, a portion of the first seal extends axially along the radial outwardly facing surface of the shroud wall. The portion may be formed to define corrugations to allow gases to flow between the blade track segment and the first seal through the corrugations.

In some embodiments, the turbine shroud assembly may also include a second seal made of sheet metal and arranged around the axis circumferentially. The second seal may have a substantially similar shape to that of the first seal. The second seal may nest with the first seal.

In some embodiments, the first seal may be formed to define a first plurality of slots that extend radially partway through the first seal. The second seal may be formed to define a second plurality of slots that extend radially partway through the second seal. The second plurality of slots can be misaligned circumferentially with the first plurality of slots.

According to another aspect of the present disclosure, a turbine shroud assembly for use with a gas turbine engine includes a carrier, a blade track segment, and a seal. The carrier may be arranged circumferentially at least partway around an axis. The blade track segment may include a shroud wall that extends circumferentially partway around the axis and an attachment feature that extends radially outward from the shroud wall. The blade track segment may be coupled with the carrier such that the blade track segment is supported radially by the carrier.

The seal can be made of sheet metal materials and arranged circumferentially at least partway around the axis. The seal may couple with the carrier for movement therewith and biased into engagement with the blade track segment. In some embodiments, the seal may be formed to define a plurality of slots that extend radially partway through the seal and axially entirely through the seal. In other embodiments, a portion of the seal may be formed to include a plurality of corrugations. In some embodiments, the seal may be bonded with the carrier to fix the seal to the carrier.

In some embodiments, the turbine shroud assembly may also include a fastener that may extend through the carrier and the seal. The fastener may couple the seal with the carrier.

In some embodiments, the seal may extend circumferentially partway around the axis by a circumferential length that may be the same circumferential length of the carrier and blade track segment.

In some embodiments, the carrier may include a first segment and a second segment that meet along an axial interface. The first segment and the second segment may define a first hanger arm and a second hanger arm. The first hanger arm and the second hanger arm may support the attachment feature of the blade track segment. The seal may extend along the first hanger arm.

In some embodiments, the turbine shroud assembly may further include a second seal that may engage with the seal. In a further embodiment, the seal may be formed to define a groove that receives a portion of the second seal therein.

In some embodiments, the seal may extend radially inward along an axially facing surface of the carrier. The seal may turn axially to extend along a portion of the shroud wall. The seal may further turn radially outwardly to extend along a portion of the attachment feature.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
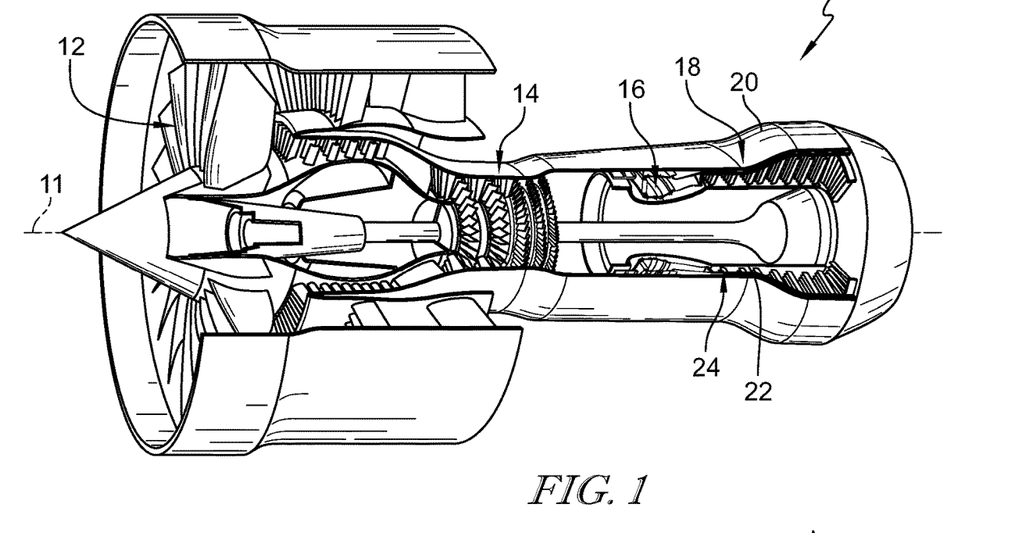
FIG. 1 is a cutaway perspective view of a gas turbine engine that includes a fan, a compressor, a combustor, and a turbine, the turbine includes a turbine shroud assembly that extended circumferentially around the axis and turbine wheels that are driven to rotate about an axis of the engine to generate power.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
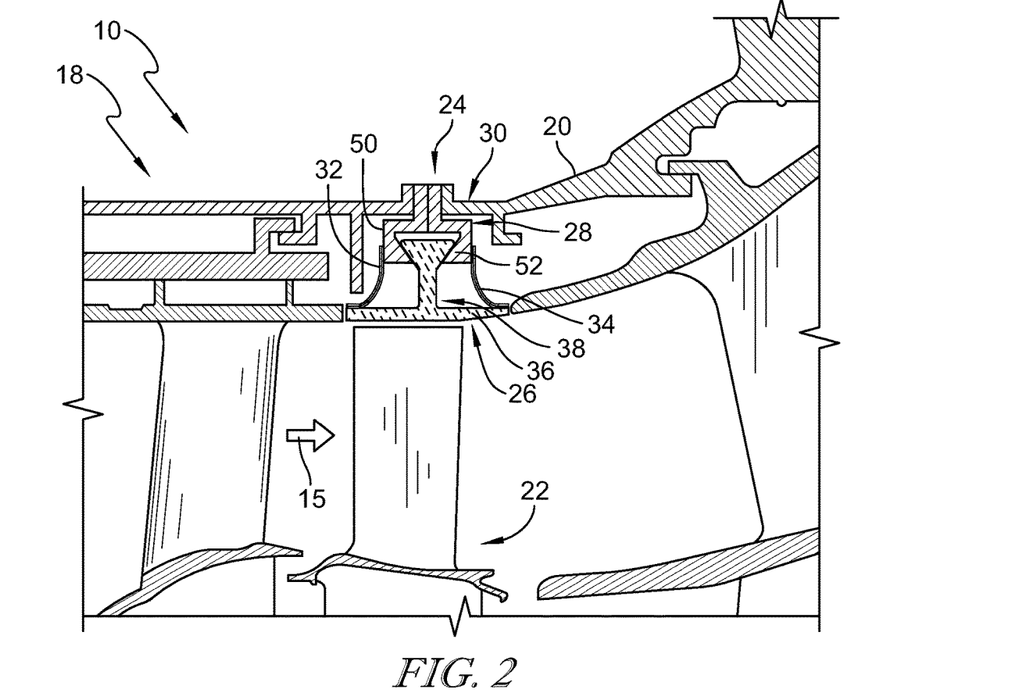
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track segment, a carrier segment, and sheet metal seals located between and sealing against the blade track segment and the carrier segment and configured to block gases from entering a cavity between the blade track segment and carrier segment.

The turbine 18 includes a turbine outer case 20, at least one turbine wheel assembly 22 and a turbine shroud assembly 24 positioned to surround the turbine wheel assembly 22 as shown in FIGS. 1 and 2. The turbine shroud assembly 24 extends circumferentially about the engine axis 11 and defines a gas path 15 outer boundary through which hot, high-pressure combustion products can flow. The turbine shroud assembly 24 includes a blade track segment 26 that forms the boundary with the gas path 15, a carrier assembly 28 that couples the turbine shroud assembly 24 to the turbine outer case 20, and a forward seal 32 and an aft seal 34 that blocks gases from flowing between the carrier assembly 28 and the blade track segment 26 as shown in FIG. 2. The turbine shroud assembly 24 cooperates with the turbine wheel assembly 22 to prevent combustion products from passing over the top of the turbine wheel assembly 22. Thereby, the combustion products force the turbine wheel assembly 22 to rotate and drive the compressor 14 and the fan 12.

Figure 3:
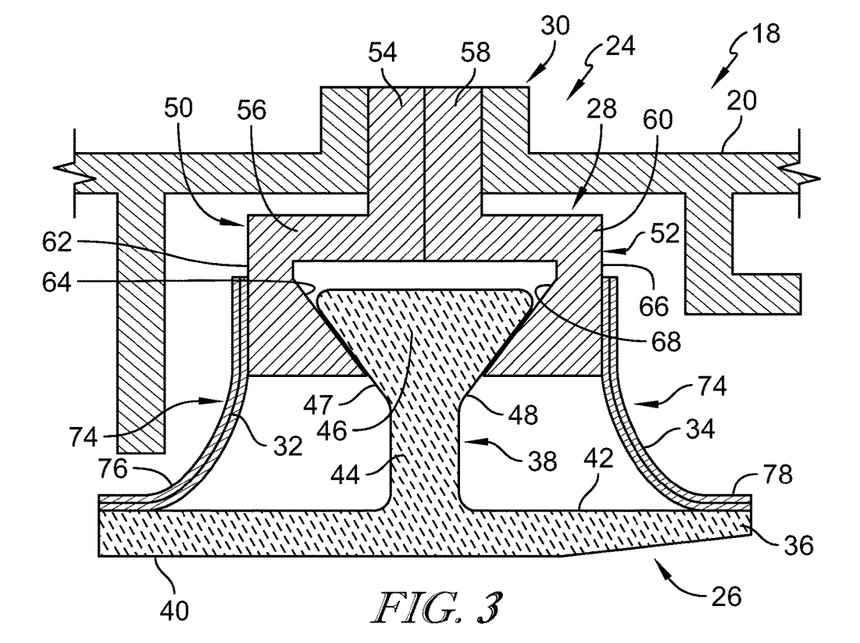
FIG. 3 is detailed view of the turbine shroud of FIG. 2 showing that the turbine shroud includes a carrier segment, forward and aft hangers, a blade track segment with a dovetail mount post, and forward and aft seals that are attached to the hangers, wherein the hangers are coupled to the carrier and extend inward and around forward and aft sides of the dovetail mount post and engage with forward and aft diagonal surfaces of the mount post, and the forward and aft seals are attached the forward and aft hanger respectively and extend radially inward and engage with an outer shroud wall of the blade track segment.

The turbine shroud assembly 24 includes a blade track segment 26, a carrier assembly 28, a forward seal 32, an aft seal 34, and a mounting system 30 configured to couple the blade track segment 26 and the carrier assembly 28 together as shown in FIG. 3. The mounting system 30 locates the blade track segment 26 in engine space relative to the carrier assembly 28 and turbine wheel assembly 22. The forward and aft seals 32, 34 are sheet-metal components that engage and seal against various surfaces of the turbine shroud assembly 24.

The carrier assembly 28 comprises metallic support components configured to interface with other metallic components spaced apart from the gas path. Illustratively, the carrier assembly 28 is segmented and extends circumferentially partway around the axis 11. The blade track segments 26 are ceramic matrix composite components configured to directly face the high temperatures of the gas path 15.

Each blade track segment 26 extends circumferentially partway around the engine axis 11 and forms the outer surface of the gas path 15 as shown in FIGS. 2 and 3. The blade track segment 26 includes a shroud wall 36 and an attachment feature 38 as shown in FIG. 3. The shroud wall 36 is arcuate and extends circumferential partway around the engine axis 11 and extends a limited axial distance across the engine axis 11. The shroud wall 36 includes a radially inner surface 40 that faces the gas path 15, and a radially outer surface 42 that faces outwardly towards the carrier assembly 28. The inner surface 37 cooperates with the turbine wheel assembly 22 to block hot gases in the gas path 15 from passing over the top of the turbine wheel assembly 22.

The attachment feature 38 extends radially outward from the outer surface 42 of the shroud wall 36 and includes a mount post 44 and a dovetail attachment feature 46 as shown in FIG. 3. The attachment feature 38 provides structure for coupling the blade track segment 26 to the carrier assembly 28. The dovetail attachment feature 46 includes a forward angled surface 47 and an aft angled surface 48. The angled surfaces 47, 48 are radially inward facing that engage with corresponding surfaces on the carrier assembly 28 to block radial inward movement of the blade track segment 26.

The carrier assembly 28 includes a first carrier segment 50 and a second carrier segment 52 as shown in FIG. 3. The first carrier segment 50 locates axially forward of the second carrier segment 52. The first carrier segment 50 includes a first mount flange 54 and a first hanger body 56. The second carrier segment 52 includes a second mount flange 58 and a second hanger body 60. The first mount flange 54 and the second mount flange 58 are radially aligned with each other and couple to the turbine outer case 20. The first hanger body 56 extends radially inward from the first mount flange 54 and is located forward of the dovetail attachment feature 46. The first hanger body 56 extends around the dovetail attachment feature 46. The second hanger body 60 extends radially inward from the second mount flange 58 and is located aft of the dovetail attachment feature 46. The second hanger body 60 extends around the dovetail attachment feature 46.

The first hanger body 56 includes a forward axially facing surface 62 and an angled surface 64 that engages the forward angled surface 47 of the dovetail attachment feature 46 as shown in FIG. 3. The second hanger body includes an aft axially facing surface 66 and an angled surface 68 that engages the aft angled surface 48 of the dovetail attachment feature 46.

The forward seal 32 extends circumferentially relative to the axis 11 and engages the first carrier segment 50 and blade track segment 26 as shown in FIG. 3. Illustratively, the forward seal 32 is segmented and extends the same circumferential length as the carrier assembly 28 and/or blade track segment 26. The forward seal 32 is solid and forms continuous surfaces. In some embodiments, the turbine shroud assembly 24 may extend circumferentially 360 degrees around the axis 11. In other embodiments, the forward seal 32 includes terminal ends that overlap each other.

The radially outer portion of the forward seal 32 is attached to the forward axially facing surface 62 of the first carrier segment 50. The forward seal 32 can be attached to the first carrier segment 50 by brazing, welding or other attachment methods. The forward seal 32 is flexible and extends radially inward and axially forward to form a J-shaped cross-section. The forward seal 32 engages with and seals against the radially outer surface 42 of the blade track segment 26. The forward seal 32 can be compressed and elastically deformed so that it is biased by the radially outer surface 42 of the blade track segment 26.

The aft seal 34 extends circumferentially around the axis 11 and engages the second carrier segment 52 and blade track segment 26 as shown in FIG. 3. Like the forward seal 32, the aft seal 34 extend only partway about the axis 11 or may be full hoop. The aft seal 34 is solid and forms continuous surfaces. In some embodiments, the turbine shroud assembly 24 may include a plurality of aft seals 34.

The radially outer portion of the aft seal 34 is attached to the aft axially facing surface 66 of the second carrier segment 52. The aft seal 34 can be attached to the second carrier segment 52 by brazing, welding or other attachment methods. The aft seal 34 is flexible and extends radially inward and axially aft to form an L-shaped cross-section. The aft seal 34 engages with and seals against the radially outer surface 42 of the blade track segment 26. The aft seal 34 can be compressed and elastically deformed so that it is biased by the radially outer surface 42 of the blade track segment 26.

The forward seal 32 and/or the aft seal 34 may be a full hoop with no terminating circumferential ends in some embodiments. The forward seal 32 and/or the aft seal 34 can be sized circumferentially to have a gap between circumferential terminating ends of the forward seal 32 and/or the aft seal 34. In another embodiment, the forward seal 32 and/or the aft seal 34 extend circumferentially around the axis 11 more than 360 degrees so that the terminating ends of the seals 32, 34 overlap and remove a leakage gap from the turbine shroud assembly 24. The seals 32, 34 may include corrugations at the radial inner portions as suggested in FIG. 6.

Figure 6:
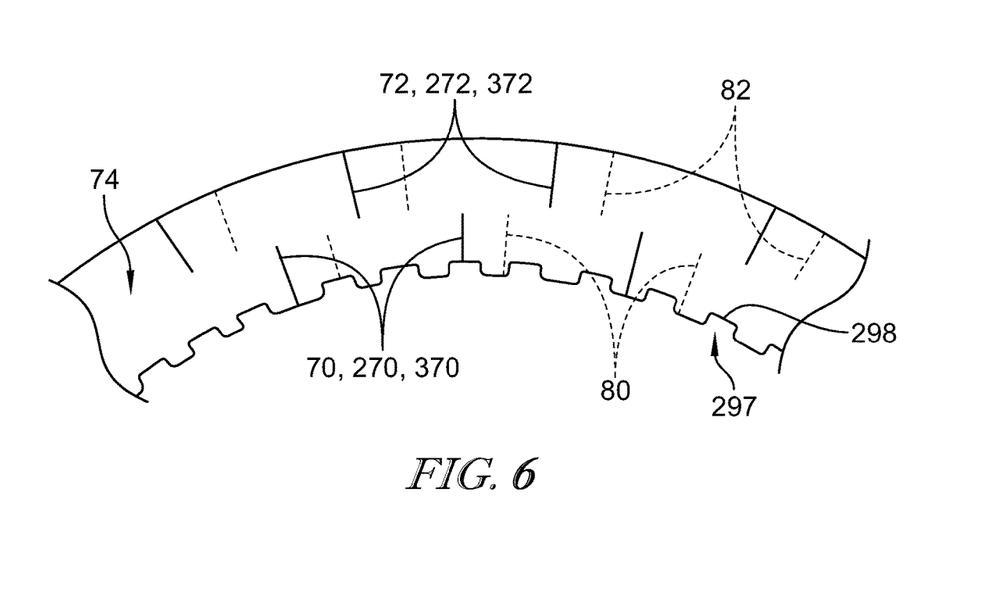
FIG. 6 is a forward elevation view of a portion of the seal of FIG. 5 showing that the seal includes slot features on an outer and an inner diameter of the seal to allow for circumferential expansion of the seal under engine running conditions, the seal also includes corrugated features at the inner diameter of the seal to form a controlled gap that can regulate airflow from one cavity to another through the seal, and further suggests a second seal nested behind the first seal, and the second seal includes similar slot features of first seal shown with dotted lines, and the slots of the first seal and second seal are misaligned circumferentially to avoid creating air leakage gaps.

The forward seal 32 and/or the aft seal 34 may also include a plurality of inner slots 70 and/or a plurality of outer slots 72 as shown in FIG. 6. The plurality of inner slots 70 are circumferentially spaced equally apart around the seal 32, 34. The plurality of inner slots 70 extend radially outward from the inner radius of the seal 32, 34, through the seal 32, 34 to approximately a mid-height 74 of the seal 32, 34. In some embodiments, the plurality of inner slots 70 may extend radially inward of the mid-height 74, and in other embodiments the plurality of inner slots 70 may extend radially outward of the mid-height 74.

The plurality of outer slots 72 are circumferentially spaced equally apart around the seal 32, 34 as shown in FIG. 6. The plurality of outer slots 72 extend radially inward from the outer radius of the seal 32, 34, through the seal 32, 34 to approximately the mid-height 74 for the seal 32, 34. In some embodiments the plurality of outer slots 72 may extend radially inward of the mid-height 74, and in other embodiments the plurality of outer slots 72 may extend radially outward of the mid-height 74. The plurality of inner slots 70 and plurality of outer slots 72 are circumferentially spaced apart so that they do not meet at the mid-height 74 of the seals 32, 34. The plurality of slots 70, 72 allow for thermal expansion of the seals 32, 34, and/or to allow a predetermined amount of leakage air to pass through the seals 32, 34. In some embodiments, the seals 32, 34 include only inner slots 70 or outer slots 72.

In a further embodiment, a second forward seal 76 overlaps the forward seal 32, and/or a second aft seal 78 overlaps the aft seal 34 as shown in the FIG. 3. The second forward seal 76 has a similar J-shape of the forward seal 32 and is arranged so that the forward seal 32 is mounted between the second forward seal 76 and the first carrier segment 50. The second forward seal 76 is attached at the outer radial portion to the forward seal 32 by brazing, welding or other attachment methods. The second aft seal 78 has a similar L-shape of the aft seal 34 and is arranged so that the aft seal 34 is mounted between the second aft seal 78 and the second carrier segment 52. The second aft seal 78 may be attached at the outer radial portion to the aft seal 34 by brazing, welding or other attachment methods.

The second forward seal 76 and the second aft seal 78 include a plurality of inner slots 80 and/or a plurality of outer slots 82 as shown in FIG. 6. The plurality of inner slots 80 of the second seals 76, 78 have similar geometry to the plurality of inner slots 70 of the forward and aft seals 32, 34. The plurality of outer slots 82 of the second seals 76, 78 have similar geometry to the plurality of outer slots 72 of the forward and aft seals 32, 34. The second seals 76, 78 are positioned circumferentially so that the plurality of slots 80, 82 do not align with the plurality of slots 70, 72 of the forward and aft seals 32, 34. The circumferential misalignment of the plurality of slots 70, 72, 80, 82 allows for better sealing to block gases from the gas path 15 from flowing between the blade track segment 26 and the carrier assembly 28 as suggested in FIG. 6.

Figure 4:
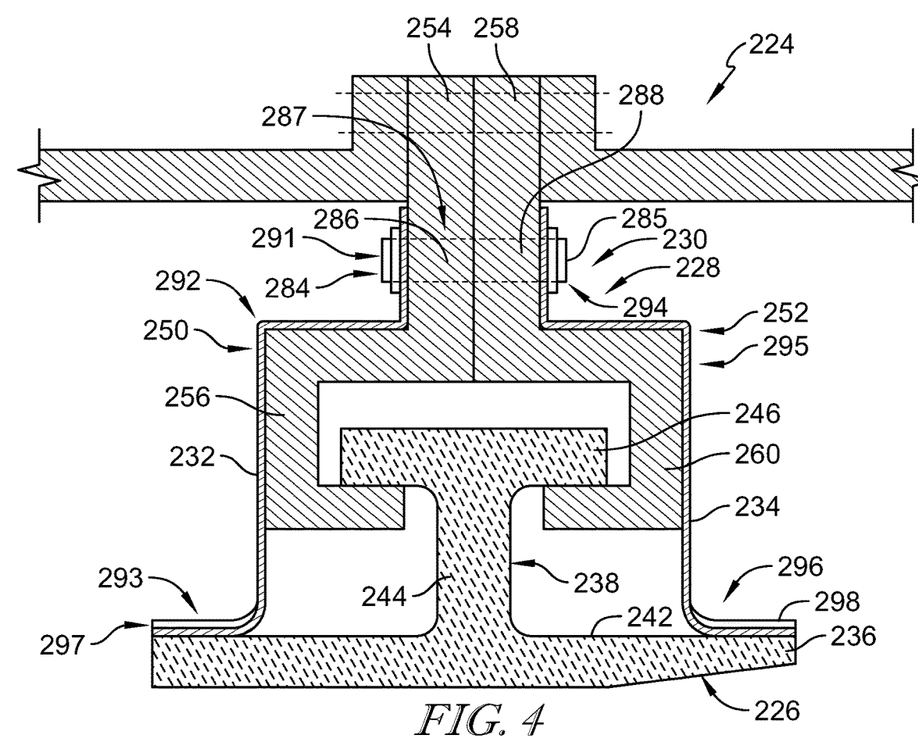
FIG. 4 is a detailed view of another turbine shroud including a carrier coupled to forward and aft hangers, a blade track segment that assembles to the forward and aft hangers, and a forward seal and an aft seal, and the forward and aft hangers include fasteners located inward of the turbine outer case that couple the forward and aft seals to the forward and aft hangers respectively.

Another embodiment of a turbine shroud assembly 224 in accordance with the present disclosure is shown in FIG. 4. The turbine shroud assembly 224 is substantially similar to the turbine shroud assembly 24 shown in FIGS. 1-3 and described herein. Accordingly, similar reference numbers in the 200 series indicate features that are common between the turbine shroud assembly 224 and the turbine shroud assembly 24. The description of the turbine shroud assembly 24 is incorporated by reference to apply to the turbine shroud assembly 224, except in instances when it conflicts with the specific description and the drawings of the turbine shroud assembly 224.

The turbine shroud assembly 224 includes a blade track segment 226, a carrier assembly 228, a mounting system 230, a forward seal 232, and an aft seal 234 as shown in FIG. 4. The blade track segment 226 includes an attachment feature 238 and a shroud wall 236 that has a radially outer surface 242. The attachment feature 238 extends radially outward from the shroud wall and includes a radially extending mount post 244 and an axially extending attachment panel 246 so that the attachment feature 238 has a T-shape cross-section. The attachment panel 246 couples to axially extending hanger features 256, 260 in the carrier assembly 228 to form part of the mounting system 230, and radially positions the blade track segment 226 relative to the carrier assembly 228.

The carrier assembly 228 includes a first carrier segment 250 and a second carrier segment 252 as shown in FIG. 4. The first carrier segment 250 includes a first mount flange 254, a seal mount portion 286, and a first hanger body 256. The second carrier segment 252 includes a second mount flange 258, a seal mount portion 288, and a second hanger body 260. The first mount flange 254 and the second mount flange 258 are radially aligned and couple to the turbine outer case 220.

The seal mount portion 286 of the first carrier segment 250 is located radially inward of the first mount flange 254 and radially outward of the first hanger body 256. The seal mount portion 288 of the second carrier segment 252 is located radially inward of the second mount flange 258 and radially outward of the second hanger body 260. The seal mount portions 286, 288 are radially aligned and include circumferentially aligned assembly holes 287. The first hanger body 256 extends radially inward from the seal mount portion 286 and extends around forward portion of the attachment panel 246. The second hanger body 260 extends radially inward from the seal mount portion 288 and extends around the aft portion of the attachment panel 246.

The mounting system 230 couples the blade track segment 226 to the carrier assembly 228 and also includes a seal mounting system 284 and a plurality of fasteners 285 as shown in FIG. 4. The seal mounting system 284 couples the forward seal 232 to the seal mount portion of the first carrier segment 250, and couples the aft seal 234 to the seal mount portion 288 of the second carrier segment 252. The plurality of fasteners 285 extends through the forward seal 232, the first carrier segment 250, the second carrier segment 252, and the aft seal 234 to couple the components together. In other embodiments, the seal 232, 234 can be attached to the seal mount portions 286, 288 of the carrier assembly 228 by brazing, welding or other attachment methods.

The forward seal 232 extends circumferentially around the axis 11 and engages the first carrier segment 250 and blade track segment 226 as shown in FIG. 4. The forward seal 232 is solid and forms continuous surfaces. The forward seal 232 is segmented and extends the same circumferential length as the carrier assembly 228 and/or blade track segment 226. In other embodiments, the seal 232 may extend fully around the axis to form a hoop.

The forward seal 232 is flexible and includes a first terminating end 291, a mid-portion 292, and a second terminating end 293. The first terminating end 291 engages the first carrier segment 250 a small distance radially outward of the seal mount portion 286. The forward seal 232 extends radially inward maintaining engagement with the first carrier segment 250 except where the plurality of fasteners 285 extends through the forward seal 232 and the first carrier segment 250. The forward seal 232 transitions to the mid-portion 292 as it reaches the first hanger body 256. The mid-portion 292 maintains engagement with the top and forward facing surfaces of the first hanger body 256 and then extends radially inward towards the radially outer surface 242 of the blade track segment 226.

The forward seal 232 transitions to the second terminating end 293 upon engaging the radially outer surface 242 and extends axially forward toward the forward end of the blade track segment 226. The forward seal 232 can be compressed and elastically deformed so that it is biased by the radially outer surface 242 of the blade track segment 226.

The aft seal 234 extends circumferentially partway around the axis 11 and engages the second carrier segment 252 and blade track segment 226 as shown in FIG. 4. The aft seal 234 is solid and forms continuous surfaces. The aft seal 234 is segmented and extends the same circumferential length as the carrier assembly 228 and/or blade track segment 226. As discussed below, the seal 234 may form a full hoop.

The aft seal 234 is flexible and includes a first terminating end 294, a mid-portion 295, and a second terminating end 296. The first terminating end 294 engages the second carrier segment 252 a small distance radially outward of the seal mount portion 288. The aft seal 234 extends radially inward maintaining engagement with the second carrier segment 252 except where the plurality of fasteners 285 extends through the aft seal 234 and the second carrier segment 252. The aft seal 234 transitions to the mid-portion 295 as it reaches the second hanger body 260. The mid-portion 295 maintains engagement with the top and aft facing surfaces of the second hanger body 260 and then extends radially inward towards the radially outer surface 242 of the blade track segment 226. The aft seal 234 transitions to the second terminating end 296 upon engaging the radially outer surface 242 and extends axially aft toward the aft end of the blade track segment 226. The aft seal 234 can be compressed and elastically deformed so that it is biased by the radially outer surface 242 of the blade track segment 226.

In the illustrative embodiment the forward and aft seals 232, 234 include corrugations 297 at the second terminating ends 293, 296 as shown in FIG. 4. The corrugations extend along the portion of the seals 232, 234 that engage with the radially outer surface 242 of the blade track segment 226. The corrugations include a plurality of raised portions 298 that are equally space circumferentially around the seals 232, 234 as shown in FIG. 6. In other embodiments, any desired spacing may be used for a desired cooling effect. The corrugations 297 allow a controlled flow of gases to flow between the blade track segment 226 and the seal 232, 234. The amount of gases allowed to flow between the blade track segment 226 and the seal 232, 234 can be controlled by adjusting the radial height and circumferential width of the plurality of raised portions 298. In another embodiment the corrugations can be included in only the forward seal 232, only the aft seal 234, or in both seals 232, 234.

The forward seal 232 and/or the aft seal 234 may be a full hoop with no terminating circumferential ends in some embodiments. The forward seal 232 and/or the aft seal 234 can be sized circumferentially to have a gap between circumferential terminating ends of the forward seal 232 and/or the aft seal 234. In another embodiment, the forward seal 232 and/or the aft seal 234 extend circumferentially around the axis 11 more than 360 degrees so that the terminating ends of the seals 232, 234 overlap and remove a leakage gap from the turbine shroud assembly 224. The seals 232, 234 may be formed to include a plurality of inner slots 270 that extend radially outward into the seals 232, 234. The seals 232, 234 may also be formed to include a plurality of outer slots 272 that extend radially inward into the seals 232, 234.

Figure 5:
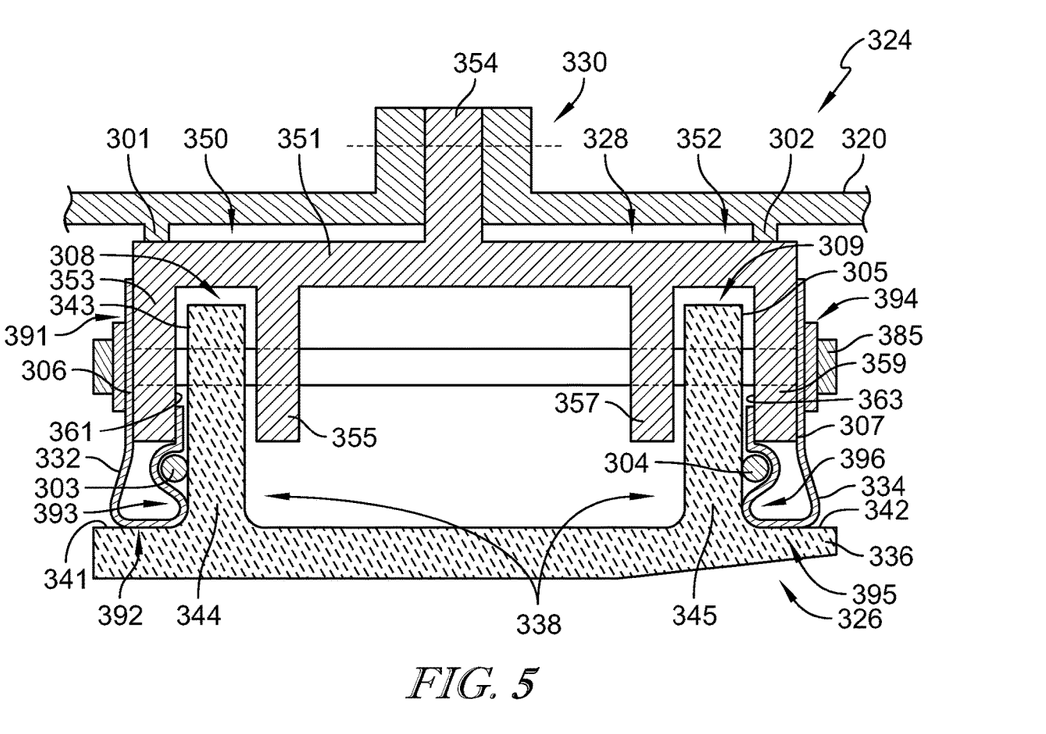
FIG. 5 is a detailed view of another turbine shroud including a carrier segment coupled to a blade track segment at a forward end and an aft end, and forward and aft seals, wherein the forward seal is coupled to the carrier at the forward end and extends radially inward to engage a forward end of a blade track shroud wall, and the aft seal is coupled to the aft end and extends radially inward to engage an aft end of the blade track shroud wall.

Another embodiment of a turbine shroud assembly 324 in accordance with the present disclosure is shown in FIG. 5. The turbine shroud assembly 324 is substantially similar to the turbine shroud assembly 24 shown in FIGS. 1-3 and described herein. Accordingly, similar reference numbers in the 300 series indicate features that are common between the turbine shroud assembly 324 and the turbine shroud assembly 24. The description of the turbine shroud assembly 24 is incorporated by reference to apply to the turbine shroud assembly 324, except in instances when it conflicts with the specific description and the drawings of the turbine shroud assembly 324.

The turbine shroud assembly 324 comprises a blade track segment 326, a carrier segment 328, a mounting system 330, a forward seal 332, and an aft seal 334 as shown in FIG. 5. The blade track segment 326 includes a shroud wall 336 and at least two attachment features 338. The attachment features 338 may include a forward mount post 344 and an aft mount post 345 spaced axially apart from the forward mount post 344. The forward and aft mount posts 344, 345 extend radially outward from the shroud wall 336. The forward mount post 344 includes a forward axially facing surface 343, and the aft mount post 345 includes an aft axially facing surface 305. The shroud wall includes a forward outer surface 341 located forward of the forward mount post 344, and an aft outer surface 342 located aft of the aft mount post 345.

The carrier segment 328 includes a support body 351, a mount flange 354, a forward attachment feature 350, and an aft attachment feature 352 as shown in FIG. 5. In the illustrative embodiment, the carrier segment 328 is segmented and extends circumferentially partway around the axis 11. The mount flange 354 extends radially outward from the support body 351 and couples to the turbine outer case 320. The forward and aft attachment features 350, 352 extend radially inward from the support body 351 to couple with the forward and aft mount posts 344, 345 respectively. The forward attachment feature 350 includes a forward flange 353 spaced apart from an aft flange 355 to form an inward opening channel 308 therebetween.

The forward mount post 344 locates in the inward opening channel 308 to couple the carrier segment 328 and blade track segment 326 together. The aft attachment feature 352 includes a forward flange 357 spaced apart from an aft flange 359 to form an inward opening channel 309 therebetween. The aft mount post 345 locates in the inward opening channel 309 to couple the carrier segment 328 and blade track segment 326 together. The forward flange 353 of the forward attachment feature 350 has an aft axially facing surface 361. The aft flange 359 of the aft attachment feature 352 has a forward axially facing surface 363.

The mounting system 330 couples the blade track segment 326, the carrier segment 328, the forward seal 332, and the aft seal 334 as shown in FIG. 5. The mounting system 330 includes a forward locating pad 301, an aft locating pad 302, and plurality of fasteners 385. The locating pads 301, 302 extend a small distance from the turbine outer case 320 and radially locate the support body 351 of the carrier segment 328. The forward locating pad 301 axially aligns with the forward attachment feature 350, and the aft locating pad 302 aligns with the aft attachment feature 352. The locating pads 301, 302 prevent rotation from front to rear of the turbine shroud assembly 324 during engine running.

The plurality of fasteners 385 extend axially through the turbine shroud assembly 324 as shown in FIG. 5. The fasteners 385 extend through the forward seal 332, the forward flange 353 of the forward attachment feature 350, the forward mount post 344 of the blade track segment 326, the aft flange 355 of the forward attachment feature 350, the forward flange 357 of the aft attachment feature 352, the aft mount post 345 of the blade track segment 326, the aft flange 359 of the aft attachment feature 352, and finally through the aft seal 334. In some embodiments the fasteners can be shortened to only couple the components around the forward attachment feature 350 or the aft attachment feature 352.

The forward seal 332 extends circumferentially around the axis 11, in the illustrative embodiment, and extends the same circumferential length as the carrier segment 328 and/or the blade track segment 326. The forward seal 332 engages the forward attachment feature 350 of the carrier segment 328 and blade track segment 226 as shown in FIG. 5. The forward seal 332 is solid and forms continuous surfaces.

The forward seal 332 is flexible and includes a first portion 391, a second portion 392, a third portion 393, and a forward rope seal 303. The first portion 391 engages the radially outer end of the forward axially facing surface 306 of the forward attachment feature 350. The forward seal 332 extends radially inward toward the forward outer surface 341 of the blade track segment 326. The forward seal 332 transitions into the second portion 392 upon engagement with the blade track segment 326. The second portion 392 extends axially aft maintaining engagement with the forward outer surface 341 until the second portion 392 reaches the forward mount post 344. The forward seal 332 transitions to the third portion 393 upon engagement with the forward mount post 344.

The forward rope seal 303 is positioned on the forward axial facing surface 343 of the forward mount post 344 radially outward of the shroud wall 336 and radially inward of the forward attachment feature 350 of the carrier segment 328. The third portion 393 extends radially outward along the forward axial facing surface 343, disengages with the forward axial facing surface 343 to extend around the forward rope seal 303, and then engages with the aft axially facing surface 361 of the forward attachment feature 350. The forward seal 332 can be compressed and elastically deformed so that it is biased by the forward rope seal 303 and the blade track segment 326.

The aft seal 334 extends circumferentially around the axis 11, in the illustrative embodiment, and extends the same circumferential length as the carrier segment 328 and/or blade track segment 326. The aft seal 334 engages the aft attachment feature 352 of the carrier segment 328 and blade track segment 226 as shown in FIG. 5. The aft seal 334 is solid and forms continuous surfaces.

The aft seal 334 is flexible and includes a first portion 394, a second portion 395, a third portion 396, and an aft rope seal 304. The first portion 394 engages the radially outer end of the aft axially facing surface 307 of the aft attachment feature 352. The aft seal 334 extends radially inward toward the aft outer surface 342 of the blade track segment 326. The aft seal 334 transitions into the second portion 395 upon engagement with the blade track segment 326. The second portion 395 extends axially forward maintaining engagement with the aft outer surface 342 until the second portion 395 reaches the aft mount post 345. The aft seal 334 transitions to the third portion 396 upon engagement with the aft mount post 345.

The aft rope seal 304 is positioned on the aft axial facing surface 305 of the aft mount post 345 radially outward of the shroud wall 336 and radially inward of the aft attachment feature 352 of the carrier segment 328. The third portion 396 extends radially outward along the aft axial facing surface 305, disengages with the aft axial facing surface 305 to extend around the aft rope seal 304, and then engages with the forward axially facing surface 363 of the aft attachment feature 352. The aft seal 334 can be compressed and elastically deformed so that it is biased by the aft rope seal 304 and the blade track segment 326.

The forward seal 332 and/or the aft seal 334 may be a full hoop with no terminating circumferential ends in some embodiments. The forward seal 332 and/or the aft seal 334 can be sized circumferentially to have a gap between circumferential terminating ends of the forward seal 332 and/or the aft seal 334. In another embodiment, the forward seal 332 and/or the aft seal 334 extend circumferentially around the axis 11 more than 360 degrees so that the terminating ends of the seals 332, 334 overlap and remove a leakage gap from the turbine shroud assembly 324. The seals 332, 334 may include corrugations at the radial inner portions. In some embodiments, the corrugations may also act as heat shields to reduce conductive heat transfer from the blade track segment 326 across the seals 332, 334. The seals 332, 334 may also be formed to include a plurality of inner slots 370 that extend radially outward into the seals 332, 334. The seals 332, 334 may also be formed to include a plurality of outer slots 372 that extend radially inward into the seals 332, 334.

Due to the low strength capability, low coefficient of thermal expansion, and geometric limitations of parts made from ceramic matrix composites, secondary airflow solutions may be conceived to seal turbine shroud assemblies. The sealing solutions described herein may serve in some representative turbine shroud assemblies, but need not be limited to only the blade track segment 26 and carrier assembly 28 documented in the explanatory figures. The embodiments described herein use sheet-metal seals that may be elastically deformed upon assembly of the turbine shroud assembly 24, forming a seal against some of the surfaces.

FIG. 3 may use elastically deformable sheet-metal seals 32, 34 that may be coupled to the carrier assembly 28. The seals 32, 34 are attached to the carrier assembly 28 at the outermost sealing interface. In the illustrative example, the carrier assembly 28 that retains the blade track segment 26 may be full-hoop annular. However, the hanger bodies 56, 60 retaining the attachment feature 38 may include slots as a means of increasing compliance of the mounting system 30. If the hanger bodies 56, 60 of the carrier assembly 28 include slots, the seals 32, 34 may need to be coupled to the carrier assembly 28 at a location radially outboard of the slots in produce a seal. The seals 32, 34 may have full-hoop portions and segmented portions.

The seal 32, 34 may include slots 70, 72 in the radial direction at multiple locations to decrease the load to elastically deform the seal. Slots 70, 72 in the seals 32, 34 may need to be a small size to close once the seals 32, 34 are deformed, otherwise too much leakage area bypassing the seal may prevent proper sealing function. Reduction in the load to deform the seal may be advantageous, as the low strength of CMC segments may be intolerant of high seal loads applied far away from support features. The seals 32, 34 in this configuration could be doubled up with overlapping seals 76, 78 and the slots 70, 72, 80, 82 staggered (turkey feather) to further reduce gaps in the seal split locations.

FIG. 4 shows the seals 232, 234 coupled to the carrier assembly 228. These seals 232, 234 may also couple with the assembly flanges between the turbine outer case 220 and carrier assembly 228.

The seals 332, 334 may be encouraged into contact with the blade track segment 326 to form a sealing interface against an axially facing surfaces 306, 307, 343, 305 as shown in FIG. 5. Axially opposed sealing can be useful versus sealing in the radial direction as seal loads may be carried by a load path that is not also responsible for resisting radial pressure loading on the blade track segment 326. This may improve the blade track segment 326 stress state. This sealing arrangement could also be employed for use with a box-section blade track segment or any other blade track segment cross section that includes a suitable axially-opposed surface against which to seal.

The sealing interface may be composed of a seal 303, 304 (e.g., a canted coil seal or rope seal) that may be encouraged into contact with the axially facing surfaces 343, 305 of the blade track segment 326 via a captured formed sheet-metal component 332, 334. A similar embodiment can be conceived in which the seal member 303, 304 may be housed within a groove on the carrier 328, and does not require a separate sheet-metal component.

The carrier 328 may be include radial slots extending radially outward through the attachment features and terminating at the support body 351. The advantage of such an arrangement may be to reduce contribution to full-hoop thermal growth, making control of the resulting segment radial position easier to manage by methods for case size-control. However, slots in the carrier 328 may leave axial leakage through the resulting slots. The seals 332, 334 may cover the slots and reduce the airflow through the slots.

Due to the differential pressure across the turbine wheel assembly 22, a torque may be applied across the blade track segment 326 which could cause it to rotate around the mount flange 354 if not restrained. To minimize this rotation issue, locating pads 301, 302 could be added to contact the support body 351 forward and aft of the attachment features 350, 352. The locating pads 301, 302 may be set-up to have an interference fit with the support body 351 which may prevent any potential rotation of the carrier 328. Depending upon the transient movement of the various components, the locating pads 301, 302 may have an interference fit with the carrier 328.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
   a carrier made of metallic materials and arranged circumferentially at least partway around an axis, the carrier having a support body and a mount flange that extends radially away from the support body,
   a blade track segment made of ceramic matrix composite materials, the blade track segment supported by the carrier to locate the blade track segment radially outward of the axis and define a portion of a gas path of the turbine shroud assembly, the blade track segment including a shroud wall that extends circumferentially partway around the axis to define the portion of the gas path and an attachment feature that extends radially outward from the shroud wall and is coupled with the support body of the carrier, and the shroud wall being spaced apart radially from the support body of the carrier to form a gap between the shroud wall and the support body, and
   a first seal made of sheet metal and arranged circumferentially at least partway around the axis, the first seal fixed with an axially exterior and axially facing surface of the support body of the carrier for movement with the carrier and biased into engagement with a radially outwardly facing surface of the shroud wall of the blade track segment to block gases from flowing through the gap formed between the carrier and the blade track segment.

2. The turbine shroud assembly of claim 1, further including a plurality of fasteners that extend through the carrier and the first seal to fasten the first seal with the carrier.

3. The turbine shroud assembly of claim 1, wherein the carrier includes a first segment and a second segment that meet along an axial interface and cooperate to define the support body and the mount flange and the support body is formed to define hanger arms that support the attachment feature of the blade track segment and the first seal extends along and is engaged with the hanger arms.

4. The turbine shroud assembly of claim 1, wherein the first seal is brazed with the carrier to fix the first seal to the carrier.

5. The turbine shroud assembly of claim 1, further comprising a second seal located axially between the attachment feature and the first seal.

6. The turbine shroud assembly of claim 5, wherein the first seal extends radially inward along the axially facing surface of the support body and turns axially to extend along a portion of the radially outwardly facing surface of the shroud wall and turns radially outwardly to extend along a portion of the attachment feature and form a groove that receives a portion of the second seal therein.

7. The turbine shroud assembly of claim 1, wherein a portion of the first seal extends axially along the radial outwardly facing surface of the shroud wall and the portion is formed to define corrugations to allow a controlled flow of the gases to flow between the blade track segment and the first seal through the corrugations, wherein the corrugations include a plurality of raised portions that are spaced apart circumferentially about the axis.

8. The turbine shroud assembly of claim 1, further comprising a second seal made of sheet metal and arranged around the axis circumferentially, the second seal having a shape substantially similar to a shape of the first seal, and the second seal nested with the first seal.

9. The turbine shroud assembly of claim 8, wherein the first seal is formed to define a first plurality of slots that extend radially partway through the first seal, the second seal is formed to define a second plurality of slots that extend radially partway through the second seal, and the second plurality of slots are misaligned circumferentially with the first plurality of slots.

10. A turbine shroud assembly for use with a gas turbine engine, the turbine shroud assembly comprising
    a carrier arranged circumferentially at least partway around an axis,
    a blade track segment including a shroud wall that extends circumferentially partway around the axis to define a portion of a gas path and an attachment feature that extends radially outward from the shroud wall and coupled with the carrier such that the blade track segment is supported radially by the carrier, the shroud wall being spaced apart radially from the carrier, and
    a seal made of sheet metal and arranged circumferentially at least partway around the axis and the seal is fixed with the carrier for movement therewith and biased into engagement with a radially outwardly facing surface of the shroud wall included in the blade track segment.

11. The turbine shroud assembly of claim 10, wherein the seal is formed to define a plurality of slots that extend radially partway through the seal and axially entirely through the seal.

12. The turbine shroud assembly of claim 10, wherein a portion of the seal that extends along the radially outwardly facing surface of the shroud wall is formed to include a plurality of corrugations that define a plurality of circumferentially spaced apart raised portions of the seal.

13. The turbine shroud assembly of claim 10, further comprising a fastener that extends through the carrier and the seal to fasten the seal with the carrier.

14. The turbine shroud assembly of claim 10, wherein the seal extends circumferentially partway around the axis by a circumferential length that is the same as a circumferential length as one of the carrier and blade track segment.

15. The turbine shroud assembly of claim 10, wherein the carrier includes a first segment and a second segment that meet along an axial interface and define a first hanger arm and a second hanger arm that support the attachment feature of the blade track segment and the seal extends along an axially forward facing surface of the first hanger arm and engages an axially forward end of the shroud wall.

16. The turbine shroud assembly of claim 10, wherein the seal is bonded with the carrier to fix the seal to the carrier.

17. The turbine shroud assembly of claim 10, further comprising a second seal engaged with the seal, wherein the seal is formed to define a groove that receives a portion of the second seal therein.

18. The turbine shroud assembly of claim 10, further comprising a second seal engaged with the seal, wherein the seal extends radially inward along an axially facing surface of the carrier and turns axially to extend along the radially outwardly facing surface of the shroud wall and turns radially outwardly to extend along a portion of the attachment feature.

19. The turbine shroud assembly of claim 10, wherein the seal includes a first portion that extends radially inward along the carrier and a second portion that extends axially along the radially outwardly facing surface of the shroud wall away from the attachment feature.

20. The turbine shroud assembly of claim 10, wherein the carrier has an exterior surface that defines an axially forwardmost face and an axially aftmost face of the carrier and the seal extends along one of the axially forwardmost face and the axially aftmost face of the carrier.

* * * * *